B. J. NAILOR.
POULTRY HOLDER.
APPLICATION FILED AUG. 23, 1922.

1,438,659.

Patented Dec. 12, 1922.

Inventor
B. J. Nailor.
Watson E. Coleman.
Attorney

Patented Dec. 12, 1922.

1,438,659

UNITED STATES PATENT OFFICE.

BESSIE J. NAILOR, OF MECHANICSBURG, PENNSYLVANIA.

POULTRY HOLDER.

Application filed August 23, 1922. Serial No. 583,838.

*To all whom it may concern:*

Be it known that I, BESSIE J. NAILOR, a citizen of the United States, residing at Mechanicsburg, in the county of Cumberland and State of Pennsylvania, have invented certain new and useful Improvements in Poultry Holders, of which the following is a specification, reference being had to the accompanying drawings.

This invention relates to poultry holders and has for its object to provide a device of this character capable of holding poultry to permit the same to be readily cleaned, stuffed or like treatment in preparing the poultry for cooking.

It is another object of the invention to provide a device of this character wherein the body of the fowl is not only supported but is capable of being suspended within a receptacle substantially in a vertical position.

It is a further object of the invention to provide a holder of this character which is resilient so that it will accommodate itself to the size of the body of the fowl and in addition to suspending the body of the fowl in a receptacle, it may be hung from any suitable support.

With these and other objects in view the invention consists in the improved construction and arrangement of parts to be hereinafter more particularly described, fully claimed and illustrated in the accompanying drawings, in which:

Figure 1:
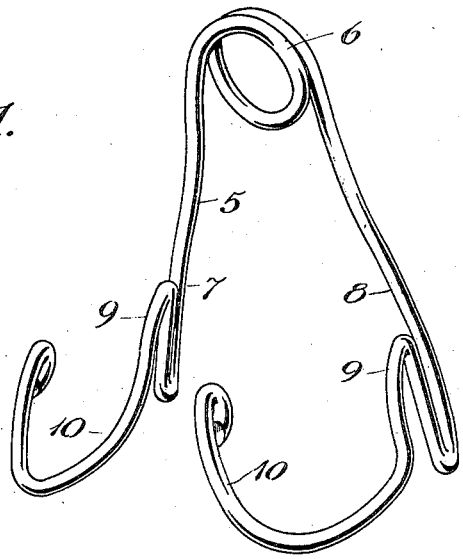
Figure 1 is a perspective view of the poultry holder constructed in accordance with an embodiment of the invention.
Figure 2:
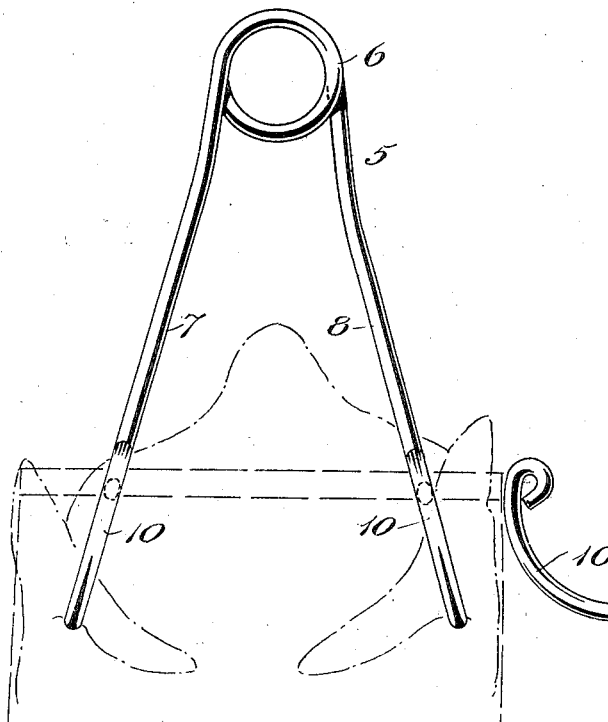
Figure 2 is a front elevation of the device applied to a fowl, the fowl and the receptacle with which the device is engaged being shown in dotted lines.
Figure 3:
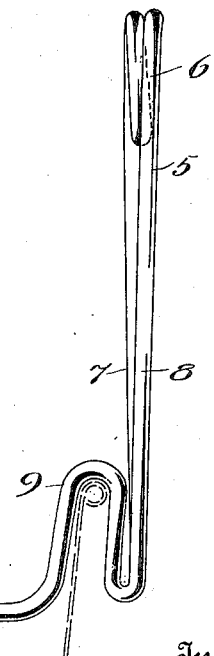
Figure 3 is a side elevation of the holder showing the same applied to a receptacle.

Referring to the drawings, 5 designates a length of resilient material such as wire which is coiled at its central portion to provide a spring member 6 and also an opening by means of which the device may be hung from a support. The spring 6 is intended to normally urge the end portions 7 and 8 of the length inwardly.

These end portions are however extended in divergent relation from the spring member. Each end portion being reverted upon itself at its central portion to provide a hook member 9. The end portions are then extended back upon the hook member and outwardly substantially at right angles to the body portion of the length and then backwardly toward the spring portion 6 in parallel relation to the body portion of the length to provide a relatively large supporting member 10. The extremity of each arm is coiled within the supporting member to prevent the same from penetrating the body of the fowl.

In the use of the holder, the supporting members 10 of each of the end portions 7 and 8 is disposed beneath the wings or legs of the fowl, the body of the fowl being disposed between said supporting members. By this means the operator may grasp the holder by the handle provided by the spring member 6 and end portions 7 and 8. With the body of the fowl thus suspended, the same may be carried from place to place without requiring the user to touch the body of the fowl. It will be noted that no portion of the body of the fowl is disposed within the hook members 9 so that said hook members may be extended over the edge of a receptacle such as a bucket to permit the body of the fowl to be disposed in a vertical position. When in this position, the body may be left to drip, or the body of the fowl may be supported for cleaning. In addition to this when it is desired to stuff the body, the supporting arms 10 may be disposed so as to receive the legs of the fowl. In this position the rear portion of the body of the fowl will be disposed above the edge of the receptacle and permits the operator to clean and stuff the body without the same being held in one hand of the operator.

This device will also be found useful when the fowl is killed, as it provides means for suspending the body to permit the same to drip.

From the foregoing it will be readily seen that this invention provides a novel form of holder capable of firmly holding poultry in such a way that the operator may use both hands in preparing the poultry for cooking. In addition to this the body of the fowl is kept in a sanitary condition as it is not necessary for the hands of the operator to come in contact with the body of the fowl other than to stuff and clean the same. All of these features are possessed by a device that can be formed from a single length of wire.

What is claimed is:—

1. A poultry holder consisting of a length of wire coiled at its central portion to provide a spring member, the end portions of said length being extended in divergent relation to each other and sprung inwardly through the medium of the spring portion, each of said end portions of the length being reverted upon itself, then reverted again upon itself in the opposite direction to provide a supporting hook, the remainder of each end portion being extended outwardly and upwardly to provide a relatively large supporting member, the supporting member of each end portion cooperating to support the body of a fowl, the hooks of said end portions being arranged to engage the edge of a receptacle.

2. A poultry holder consisting of a length of wire coiled at its central portion to provide a spring member, and a pair of arms, each arm being bent substantially at its intermediate portion to provide hooks adapted to engage a receptacle, the extremities of said arms being bent to provide supporting hooks, the bill portions of the receptacle engaging hooks serving as portions of the supporting hooks.

In testimony whereof I hereunto affix my signature.

BESSIE J. NAILOR.